(12) United States Patent
Koohgoli et al.

(10) Patent No.: US 9,471,285 B1
(45) Date of Patent: Oct. 18, 2016

(54) IDENTIFYING SOFTWARE COMPONENTS IN A SOFTWARE CODEBASE

(71) Applicant: Protecode Inc., Kanata (CA)

(72) Inventors: Mahshad Koohgoli, Ottawa (CA); Xiaojun Shen, Kanata (CA); Christopher Potts, Ashton (CA); Aida Malaki, Ottawa (CA)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/795,559

(22) Filed: Jul. 9, 2015

(51) Int. Cl.
 *G06F 15/16* (2006.01)
 *G06F 9/455* (2006.01)
 *G06F 9/44* (2006.01)
 *G06F 9/54* (2006.01)

(52) U.S. Cl.
 CPC .................. *G06F 8/315* (2013.01); *G06F 9/54* (2013.01)

(58) Field of Classification Search
 CPC ........... G06F 9/44505; G06F 11/3604; G06F 21/105; G06F 21/16; G06F 21/14; G06F 21/125; G06F 21/10; G06F 21/121; G06F 8/315; G06F 9/54
 See application file for complete search history.

(56) References Cited

U.S. PATENT DOCUMENTS

| | | | | |
|---|---|---|---|---|
| 6,668,325 B1* | 12/2003 | Collberg | ................ | G06F 21/14 713/194 |
| 7,051,200 B1* | 5/2006 | Manferdelli | ............ | G06F 21/10 705/57 |
| 7,549,147 B2* | 6/2009 | Futoransky | ........... | G06F 21/125 380/277 |
| 7,802,087 B2* | 9/2010 | Gatto | ...................... | A63F 13/12 463/29 |
| 8,510,726 B2* | 8/2013 | Eisen | ........................ | G06F 8/51 717/162 |
| 8,914,674 B2* | 12/2014 | Shah | ...................... | G06F 21/10 714/27 |
| 2012/0151600 A1* | 6/2012 | Yun | ...................... | G06F 21/125 726/26 |
| 2014/0244679 A1* | 8/2014 | Fedorenko | ................ | G06F 8/71 707/758 |
| 2015/0301808 A1* | 10/2015 | Goetz | ................. | G06F 9/44521 717/140 |

\* cited by examiner

*Primary Examiner* — Thuy Dao
(74) *Attorney, Agent, or Firm* — HIPLegal LLP; Judith Szepesi

(57) ABSTRACT

Systems, methods, and computer program embodiments are disclosed for detecting third party software components in a software codebase. In an embodiment, a source file containing source code may be received at a server, and a code signature may be generated for the source file based on a determined structure of the source code. The generated code signature may then be compared to signatures stored in a reference database to identify matching third party software files. In an embodiment, the reference database may store a plurality of code signatures corresponding to third party software files. A list of the identified third party software files may be created and presented to a user.

21 Claims, 7 Drawing Sheets

IDENTIFYING SOFTWARE COMPONENTS IN A SOFTWARE CODEBASE

BACKGROUND

1. Field

Embodiments of the systems and methods described herein are generally related to software and source code analysis.

2. Background

Developers often incorporate third party software into software applications and codebases to add desired functionality, reducing the burden to develop particular functionality internally. For example, the growing number of quality open source software products have significantly reduced software development time at minimal cost. However, individuals and organizations making use of third party software must manage quality and security vulnerabilities of the software, as well as ensure compliance with license obligations associated with the software, failure of which may lead to serious financial and legal repercussions.

As the size of a software codebase grows, managing incorporated third party software components becomes increasingly complicated. For example, third party software may be part of or used by multiple software files within a codebase by virtue of insertion into multiple software components, file duplication, and copy and paste of code segments. Further, third party code may be modified or adapted for various uses, potentially interspersing third party code with internally written code. Manual tracking of third party software is insufficient for this purpose, and a robust automated solution is needed to ensure software security and compliance with license obligations.

SUMMARY

Systems, methods, and computer program embodiments are disclosed for detecting third party software components in a software codebase. In an embodiment, a source file containing source code may be received at a server, and a code signature may be generated for the source file based on a determined structure of the source code. The generated code signature may then be compared to signatures stored in a reference database to identify matching third party software files. In an embodiment, the reference database may store a plurality of code signatures corresponding to third party software files. A list of the identified third party software files may be created and presented to a user.

In an embodiment, the code signature for the source file may be generated by first determining a programming language of the source file. A list of language reserved keywords and key phrases associated with the programming language may then be identified. Text that does not match a language reserved keyword or key phrase, as well as language-specific control characters and control character sequences, may be removed from the source file. Each remaining keyword and key phrase may then be replaced with a corresponding compact byte representation to produce an encoded sequence. The encoded sequence may be hashed to produce a code signature.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Example System

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Current solutions to automate the detection of third party software components within a software codebase suffer from limitations that do not address modifications to third party files and/or require significant processing power and time. One common method for this detection relies on information embedded within headers of third party software files. For example, open source software files typically include comments or informational lines at the beginning of the file that indicate information such as, but not limited to, copyright and licensing information, file name, open source project name, authorship, and version information. This method requires this information to be present within each third party software file and may not be able to detect the presence of third party software components when either headers are missing from third party files or code segments from third party files are incorporated into another file.

Another common solution relies on metadata associated with third party software files, such as but not limited to, file names and file paths. A developer may change file names and locations of files to adapt for use in a software codebase, for example when file naming and folder hierarchy requirements are set. This method is inaccurate in these cases, and further is unable to detect the presence of third party code segments within another source file.

An alternate approach to detection of third party software components within a software codebase relies on comparison of code samples from the software codebase to source code of third party software files. This method allows for third party code segments within the software codebase to be identified, but may require significant processing time and power, depending on the number of code samples being compared and the uniqueness of each code sample. This method may also be inaccurate when aspects of the third party software code are changed, such as but not limited to, variable, class, and function names. An approach for detection of third party software components within a software codebase is described below that addresses the previously described issues.

Figure 1:
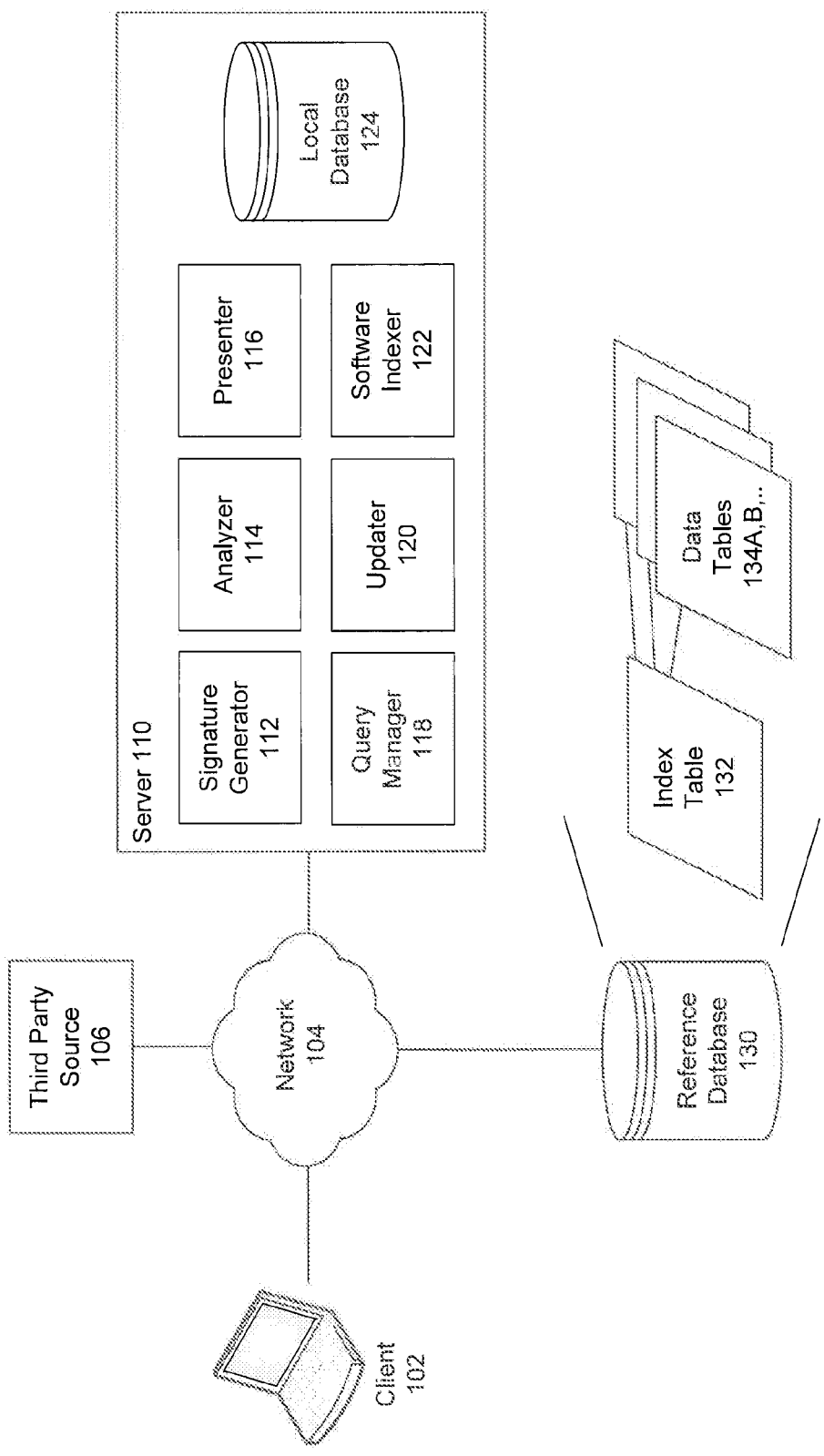
FIG. 1 is a diagram illustrating an example system for detecting third party software components in a software codebase, according to an embodiment.

FIG. 1 is a diagram illustrating an example system for detecting third party software components in a software codebase, according to an embodiment. System 100 includes a client device 102 coupled to a server 110 via a network 104. Network 104 may be any type of computer network capable of communicating data, for example, a local area network, a wide area network (e.g., the Internet), or any combination thereof. Client 102 and server 110 may be any type of computing device, including, but not limited to, a desktop, server, mobile device, appliance, or embedded device. In an embodiment, server 110 may include signature generator 112, analyzer 114, presenter 116, query manager 118, updater 120, software indexer 122, and local database 124. Server 110 may also be coupled to reference database 130 and third party source 106. Each of the servers and modules in FIG. 1 may be implemented on the same or different computing systems having server functionality, in hardware, software, or any combination thereof.

In an embodiment, software indexer 122 may crawl one or more third party sources in order to discover and retrieve third party software files. For example, third party 106 may be a website hosting an open source software project. In this case, software indexer 122 may retrieve a plurality of open source software files from third party source 106. In an embodiment, a list of known third party sources, such as third party source 106, may be maintained by server 110. Software indexer 122 may periodically or on demand browse each known third party source in order to retrieve new and updated third party software files.

Once the plurality of third party software files are retrieved, software indexer 122 may analyze each file to extract and derive identifying file attributes and information. In an embodiment, this information may include, but is not limited to, authorship information, license information and obligations, copyright information, code quality attributes, encryption scheme, file path, and file origin. Signature generator 112 may generate a code signature for each of the third party software files, as will be discussed in further detail below.

In an embodiment, updater 120 may write the generated code signature, as well as the identifying attributes and information, to a reference database 130. This enables known third party software files to be identified based on a corresponding code signature and identifying attributes. As illustrated in FIG. 1, reference database 130 may store the data in a plurality of different data tables 134A, B, . . . . To improve performance of database queries and updates, database 130 may also include an index table 132. In an embodiment, updater 120 may query index table 132 to assist with data insertions and updates, and query manager 118 may query index table 132 to assist with data retrieval. In an embodiment, the index table may point to entries in data tables 134, which include the complete individual location points. Or, in an embodiment where the database is de-normalized, the index table may itself include the individual location points in part or in full. In this way, index table 132 may be used to improve performance of database queries and updates.

In an embodiment, a request may be received by server 110 from client 102 to determine third party software components present in a software codebase. For example, an individual or company may be concerned about legal issues and potential security vulnerabilities associated with using third party code (e.g., open source or commercially purchased software packages) within a developed application codebase. The request may include a plurality of source files containing source code or references to a plurality of source files to analyze. If references to source files are received, analyzer 114 may retrieve the actual source files based on the received reference information.

For each received source file, signature generator 112 may generate a code signature for the source file based on the structure and content of the source code contained within the source file. In an embodiment, signature generator 112 may first determine a programming language of the source file. In an embodiment, the programming language may be detected based on the file extension. For example, the file extension "py" may indicate the Python programming language. In an embodiment, the programming language may also be determined through analysis of the file content. For example, aspects of the code structure, such as language-specific reserved keywords, text sequences, or indentation may be compared to known aspects associated with the programming language.

Once a programming language is identified, signature generator 112 may identify a list of language reserved keywords and key phrases associated with the programming language. For example, terms such as "break" and "return" are language reserved keywords in the C programming language. The list of language reserved keywords and key phrases may be stored and maintained in reference database 130, local database 124, or external to reference database 130 and server 110.

Signature generator 112 may then remove text from the source file that does not match an identified language reserved keyword or key phrase. Signature generator 112 may also remove language-specific control characters and control character sequences from the source file. In an embodiment, a list of language-specific control characters and control character sequences may similarly be stored and maintained in reference database 130, local database 124, or external to reference database 130 and server 110. The removal of content from the source file that does not match language reserved keywords or key phrases addresses issues associated with, for example, variable, class, and function name changes within the source file, as the code signature no longer relies on naming conventions.

At this point, signature generator 112 may replace each language reserved keyword and key phrase in the source file with a corresponding compact byte representation to produce an encoded sequence. In an embodiment, each language reserved keyword and key phrase may be mapped to a byte representation, for example a single ASCII character. These mappings may be predefined and stored, for example, in reference database 130 or local database 124, or defined dynamically by signature generator 112. This drastically reduces the size of the encoded sequence for storage and processing. One of skill in the art will appreciate that the corresponding compact byte representations need not be exactly one byte in size, but will typically be smaller in size than the corresponding language reserved keywords and key phrases.

In an embodiment, signature generator 112 may hash the encoded sequence to produce a code signature for the source file. Any available hash function may be used for this purpose, such as but not limited to, MD5, SHA1, SHA2, RIPEMD, or Whirlpool. Signature generator 112 may generate code signatures for third party software files in the same manner as described for source files of the software codebase.

The generated code signature enables identification of present third party software components regardless of basic modifications made to the contained third party software. For example, changes to variable names, function names, or other syntactic changes to text separate from language reserved keywords and key phrases will not affect the identification of third party software components, as these names do not affect the generated code signature. This may be particularly important when an organization makes use of a code compressor or minifier to reduce file sizes within a software portfolio. For example, code compressors and minifiers often change variable and function names to shorter character representations in order to reduce file size.

Changes to code structure, interspersing of internal code with third party software code, and third party auto-generated code may be addressed through generation of code signatures for code modules within a source file. A code module may be a portion of the source file determined by the syntax or semantics of the contained source code, for example, a class, function, or other logical division of code. In an embodiment, analyzer 114 may divide the source code of the source file into one or more code modules. Analyzer 114 may use programming language-specific characteristics to determine logical divisions for code modules. In an embodiment, the level of granularity of code modules may be adjusted automatically or by a user. For example, identification of third party software may be optimized by changing the granularity of code modules to represent methods, functions, and code blocks of a particular scope or size, in contrast to encompassing classes and containers.

Once defined, code signature generator 112 may generate code signatures for each of the code modules, as described previously. In an embodiment, the generated code signatures for each of the code modules may be combined to produce a code signature for the source file. In an embodiment, software indexer 122 may similarly divide third party software files into code modules and generate code signatures for each code module.

As described above with respect to third party software files, in an embodiment, analyzer 114 may parse the source file to determine identifying attributes of the source file, such as but not limited to, authorship information, license information and obligations, copyright information, code quality attributes, encryption scheme, file path, and file origin. Analyzer 114 may then use the generated code signatures for the source file and/or the code modules of the source file, as well as identifying attributes to identify third party software components present within the source file.

In an embodiment, analyzer 114 may compare the code signature for the source file to code signatures of third party software files stored in reference database 130. Analyzer 114 may then create a list of identified third party software files corresponding to matching code signatures. In an embodiment, the list of identified third party software files may be stored in local database 124 and/or sent to client 102. In order to identify present third party software components, according to an embodiment, analyzer 114 may also compare one or more of the generated code signatures for the code modules of the source file to code signatures stored in the reference database. This allows for partial matches of software files to be identified. As previously discussed, this is particularly useful when changes to the structure of a source file have been made, third party code has been interspersed with developed code, or code automatically generated by third party software is being used.

In an embodiment, local database 126 may store code signatures for matching third party software files. In this manner, local database 126 may act as a cache for analyzer 114 and query manager 118, obviating the need to query reference database 130 for each subsequent comparison. When comparing code signatures of a source file, analyzer 114 may first compare each code signature to code signatures stored in local database 126 before attempting to query reference database 130.

The code signatures and partial matching procedures, as described above, enable identification of third party software components within a source file irrespective of particular changes to the third party software. However, this may lead to false identification of third party software in some cases. This issue is addressed in multiple ways. First, in an embodiment, one or more thresholds may be used by analyzer 114 to determine whether partial matches indicate the presence of a third party software component within a source file. For example, if code modules are determined to be very small (e.g., two to three lines of code on average), matching of a single code module signature to a third party code signature may be coincidental or uninformative. Thresholds may be used to reduce identification of third party software due to low confidence matches and may specify a percentage (or other quantitative indication) of code signatures for a source file that must match code signatures for a third party software file. For example, a percentage threshold of 20% may be set to indicate that 20% of the code module signatures for the source file must match code signatures for a third party software file stored in reference database 130 to be identified as a matching third party software file.

Second, in an embodiment, the determined identifying attributes and information of the source file and third party software files may be used by analyzer 114 to filter the list of identified third party software files. In an embodiment, if inconsistencies are found between specific identifying attributes of the source file and an identified third party software file, analyzer 114 may remove the identified third party software file from the list. For example, differences in authorship, copyright ownership information, and license information may indicate a false match when comparing code signatures of entire files, and corresponding third party software files may be removed from the list. In an embodiment, filtering parameters may be adjusted to ensure accuracy of third party software detection while minimizing false positive identification.

Presenter 116 may present the list of identified third party software file to client 102. In an embodiment, client 102 may be operated by a user, for example, an individual requesting analysis of software files within a software codebase. In various embodiments, the list of identified third party software files may be presented in a graphical user interface, such as a web page or web application, in a generated report, or via an application programming interface (API). The list of identified third party files may include additional information, such as but not limited to, authorship and origin information of each third party file, matching code segments or modules, and various statistics. The list may be combined with list of third party software files identified for other source files to provide statistics and an overall view of present third party software components within an entire software codebase.

Figure 2:
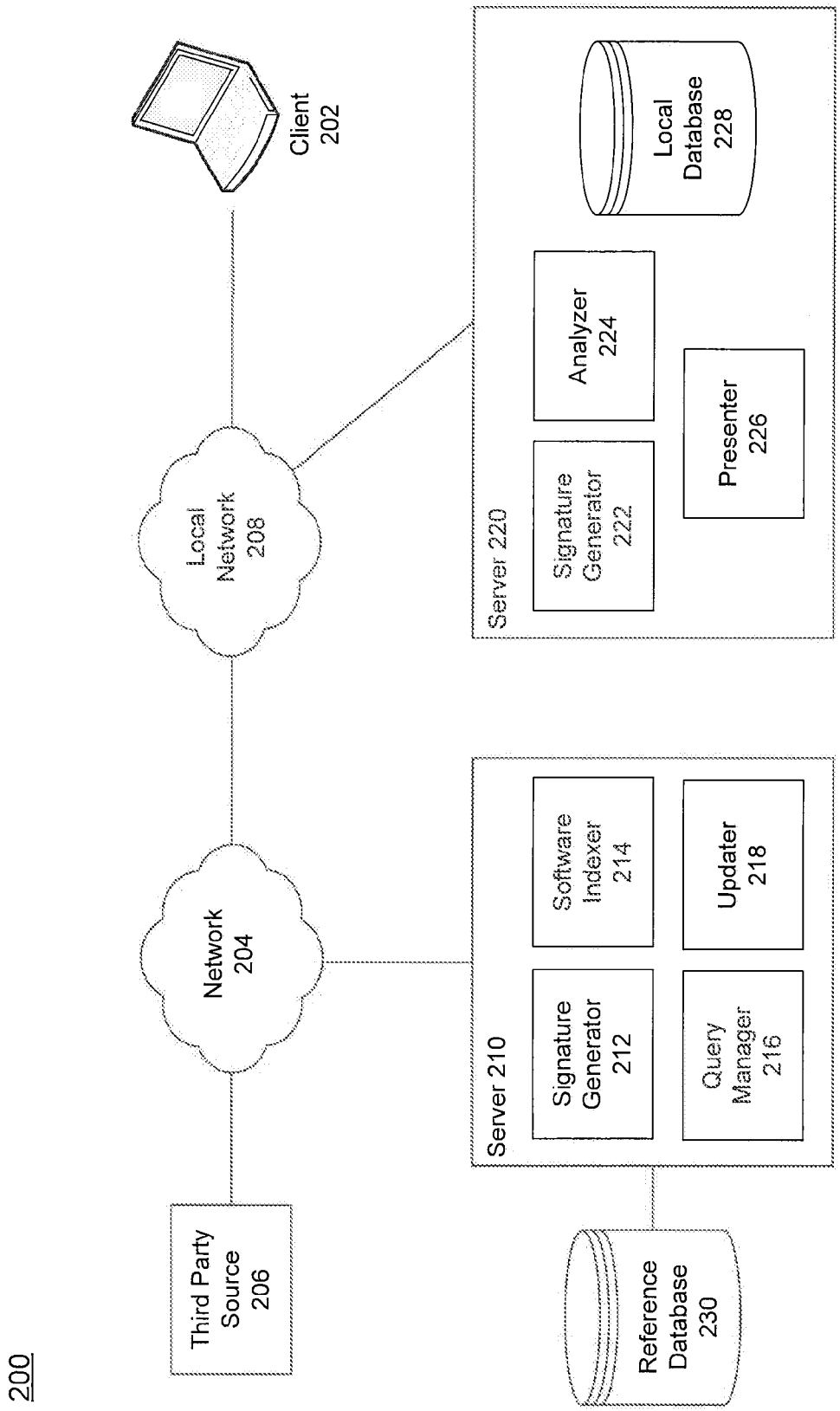
FIG. 2 is a diagram further illustrating an example system for detecting third party software components in a software codebase, according to an embodiment.

FIG. 2 is a diagram further illustrating an example system for detecting third party software components in a software codebase, according to an embodiment. System 200 includes a client device 202 coupled to a server 220 via a local area network 208, for example an enterprise network. Local area network 208 may be coupled to network 204. Network 204 may be any type of computer network capable of communicating data, for example, a local area network, a wide area network (e.g., the Internet), or any combination thereof. Network 204 may further be coupled to third party source 206 and a server 210, which may in turn be coupled to reference database 230. Client 202, third party source 206, and reference database 230 may be similar to client 102, third party source 106, and reference database 130 of FIG. 1, respectively.

Server 210 may include signature generator 212, software indexer 214, query manager 216, and updater 218. Software indexer 214, query manager 216, and updater 218 may perform tasks similar to software indexer 122, query manager 118, and updater 120 of FIG. 1, respectively. Signature generator 212 may perform tasks similar to signature generator 112 of FIG. 1 with respect to signature generation for third party software files.

Server 220 may include signature generator 222, analyzer 224, and presenter 226. Analyzer 224 and presenter 226 may perform tasks similar to analyzer 114 and presenter 116 of FIG. 1, respectively. Signature generator 222 may perform tasks similar to signature generator 112 of FIG. 1 with respect to signature generation for source files within a software codebase. Each of the servers and modules in FIG. 2 may be implemented on the same or different computing systems having server functionality, in hardware, software, or any combination thereof.

The embodiment illustrated in FIG. 2 may represent detection of third party software components within software residing in a home, office, or enterprise environment. In this case, analysis of internal source code may occur within local area network 208, which may be a private network, preventing transmission of internal data over a public network. In an embodiment, local area network 208 may be part of a larger private wide area network connecting multiple sites of an enterprise. Retrieval and preparation of third party software files for comparison may occur outside of the home, office, or enterprise environment, and transmission between network 204 and local area network 208 may be limited to, for example, signatures and attributes of known third party software files.

Figure 3:
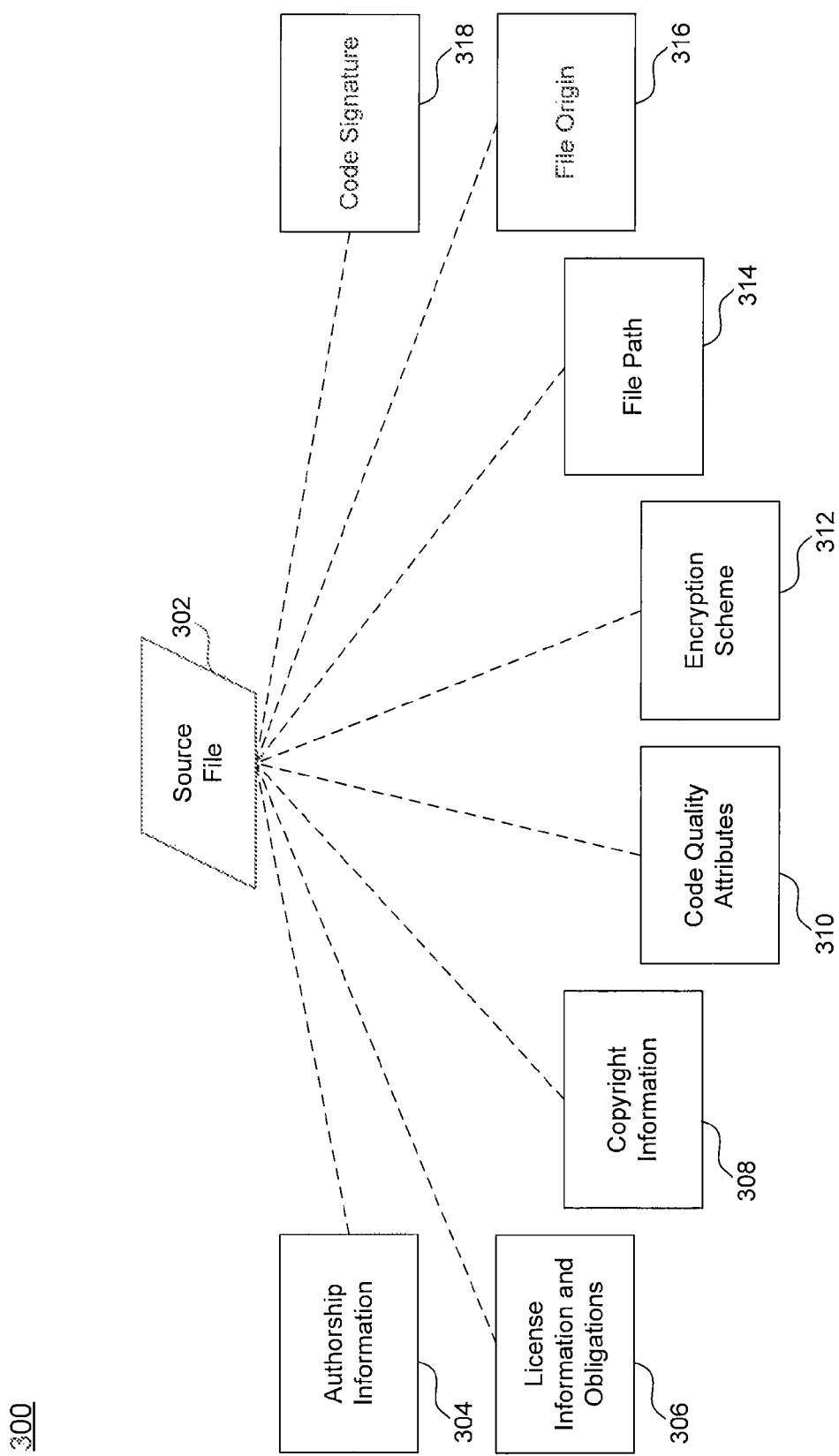
FIG. 3 is a diagram illustrating example data and information derived from a source file for use in detecting third party software components, according to an embodiment.

FIG. 3 is a diagram illustrating example data and information derived from a source file for use in detecting third party software components, according to an embodiment. As described previously, a source file 302 may be analyzed, for example by analyzer 114 of FIG. 1, to extract or derive identifying attributes 304-316 of source file 302. A code signature 318 for source file 302 may also be generated, for example by signature generator 112 of FIG. 1. Source file 302 may be a third party software file or a source file of a software codebase internal to an organization or owned by one or more individuals. Identifying attributes 304-316 and code signature 318 may be used to detect third party software components within source file 302, as previously described.

In an embodiment, identifying attributes that may be extracted or derived from source file 302 may include, but are not limited to, authorship information 304, license information and obligations 306, copyright information 308, code quality attributes 310, encryption scheme 312, file path 314, and file origin 316.

Authorship information 304 may include individuals or organizations contributing to authorship of source file 302. License information and obligations may include any license information incorporated into the content or metadata of source file 302. For example, source files adhering to open source licenses, such as the GNU General Public License (GPL) or MIT License, may have information about and terms of the license incorporated into the source file. In a further example, the license name and license terms may be extracted from source file 302 as identifying information.

Copyright information 308 may include any copyright information incorporated into the content or metadata of source file 302. For example, the content of a source file often contains a copyright symbol or the explicit term "copyright." Associated text may be extracted as an identifying attribute of source file 302.

Code quality attributes 310 may include explicit or derived indications of issues within source file 302. For example, source file 302 may contain a comment indicating a limitation or bug within the source code contained in the source file. Code quality attributes may also be derived through analysis of source file 302, for example security vulnerabilities determined through source code analysis. Another example may include analysis of the number of code lines against the number of comment lines in source file 302 to determine the documentation quality of source file 302. Yet another example may include analysis of variable definitions in relation to variable usage (e.g., checking for variable definitions prior to usage) to determine potential runtime issues. Code quality attributes 310 may be used for purposes beyond detection of third party software components within a software codebase.

If source file 302 has been encrypted, encryption scheme 312 may include identifying encryption information found in the content, metadata, or through analysis of source file 302. File path 314 may indicate a location of source file 302 within a directory structure. File origin 316 may include information related to the origin of source file 302, such as but not limited to, a network address, for example a uniform resource locator (URL) or Internet Protocol (IP) address, of where source file 302 was retrieved from and the name of a project which source file 302 belongs to, for example in the case that source file 302 is part of an open source project.

Example Method

Figure 4:
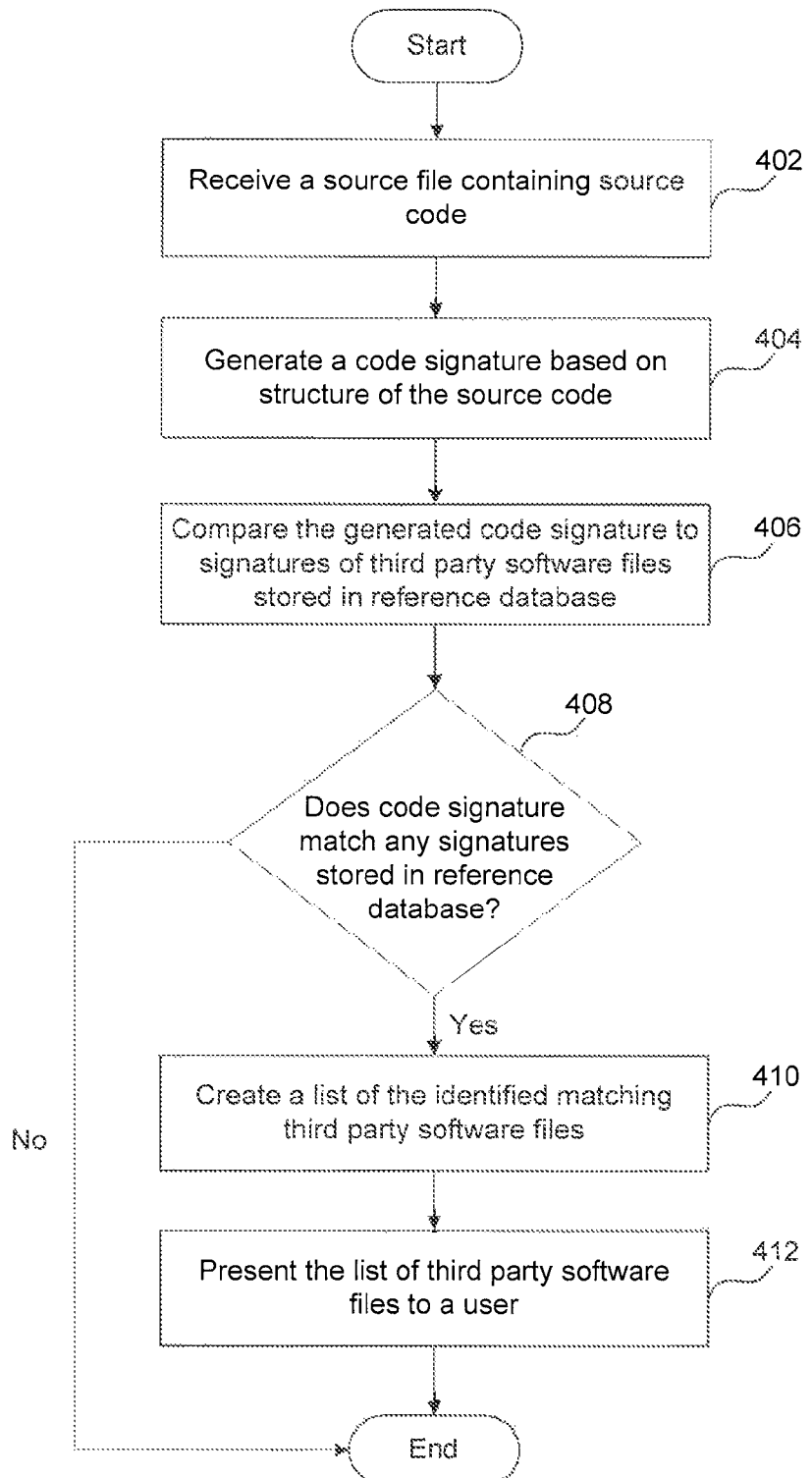
FIG. 4 is an example method for detecting third party software components within a source file, according to an embodiment.

FIG. 4 is an example method for detecting third party software components within a source file, according to an embodiment. As previously described, detection of third party software files may be particularly important for individuals or companies concerned about legal issues and potential security vulnerabilities associated with using third party code. Method 400 begins at stage 402 by receiving a source file containing source code at a server. At stage 404, a code signature for the source file may be generated based on a determined structure of the source code, further details of which are described with respect to FIGS. 1 and 5.

At stage 406, the generated code signature may be compared to code signatures stored in a reference database, such as reference database 130 of FIG. 1, to identify matching third party software files. The reference database may store a plurality of code signatures corresponding to known third party software files. In an embodiment, third party software files may be retrieved and analyzed by a software indexer, such as software indexer 122 of FIG. 1. The software indexer may extract and derive identifying attributes for retrieved third party software files, and a signature generator, such as signature generator 112 of FIG. 1, may generate a code signature for each third party software file. The identifying attributes and code signatures of third party software files may be written to the reference database.

At stage 408, it is determined whether the generated code signature matches any of the code signatures stored in the reference database. If no matches are found, the method ends. If one or more matches are found, at stage 410, a list may be created of identified third party software files corresponding to matching code signatures in the reference database. In an embodiment, stages 406-410 may be repeated using generated code module signatures for the source file. For example, if no matches are found at stage 408 when comparing the code signature for the complete source file to code signatures stored in the reference database, stages 406-410 may be executed for each generated code module signature for the source file. Code module signatures for the source file may be generated as described with respect to FIG. 1. This allows for third party software files to be identified based on partial file matches. At stage 412, the created list of identified third party software files may be presented to a user, for example in a graphical user interface, a generated report, or via an API.

Figure 5:
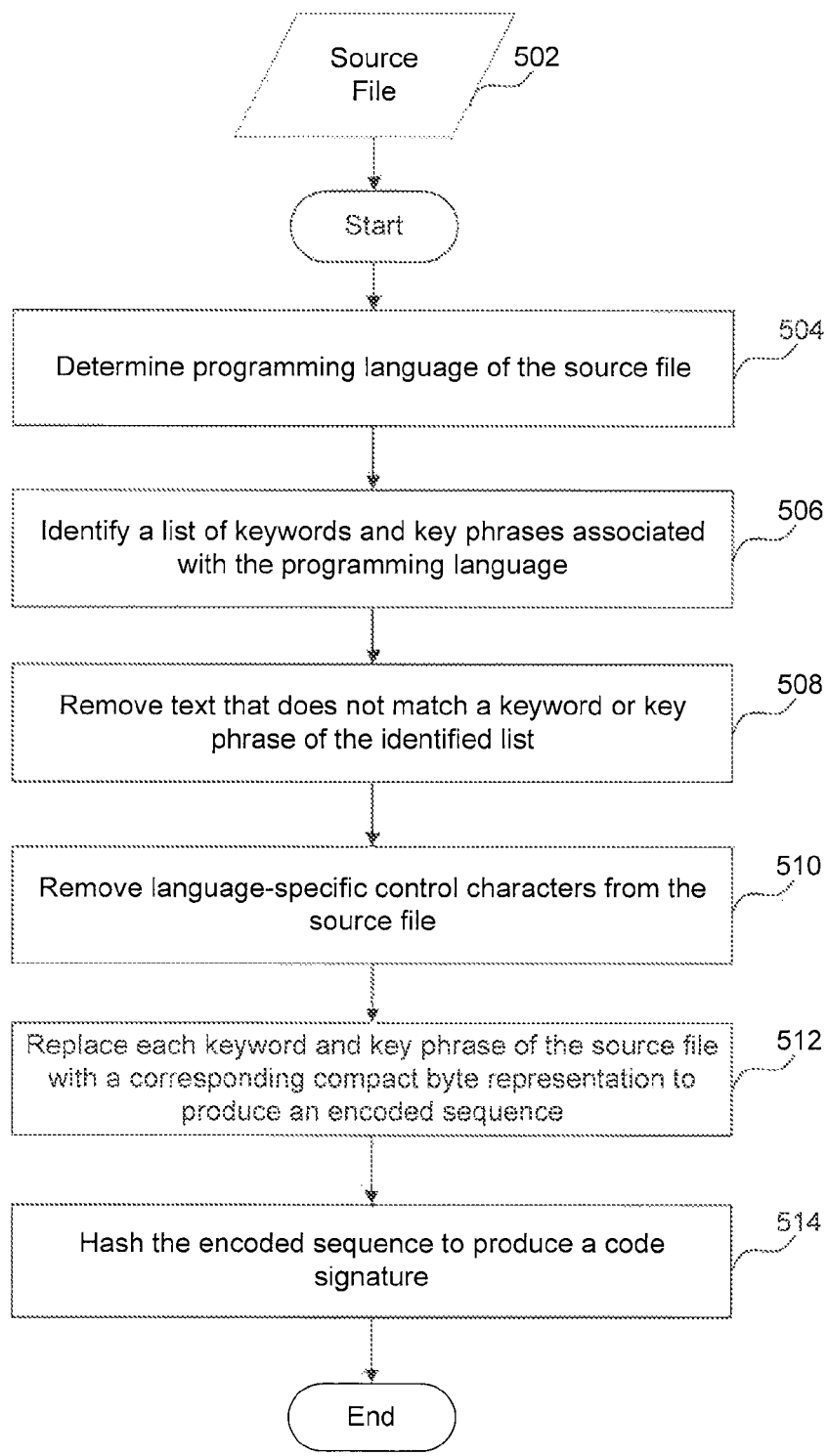
FIG. 5 is an example method for generating a code signature for a source file, according to an embodiment.

FIG. 5 is an example method for generating a code signature for a source file 502, according to an embodiment. Method 500 begins at stage 504 by determining a programming language of the source file. In an embodiment, the programming language may be detected based on the file extension. For example, the file extension "py" may indicate the Python programming language. In an embodiment, the programming language may also be determined through analysis of the file content. For example, presence of unique language-specific reserved keywords, or aspects of the code structure, such as text sequences or indentation may be compared to known aspects associated with the programming language.

At stage 506, a list of language reserved keywords and key phrases associated with the programming language is identified. For example, terms such as "break" and "return" are language reserved keywords in the C programming language. In an embodiment, the list of language reserved keywords and key phrases may be stored and maintained in a reference database, such as reference database 130 of FIG. 1, or a local database, such as local database 124 of FIG. 1.

At stage 508, text that does not match a language reserved keyword or key phrase of the identified list is removed from the source file. At stage 510, language-specific control characters and control character sequences are removed from the source file. The removal of content from the source file that does not match language reserved keywords or key phrases addresses issues associated with, for example, variable, class, and function name changes within the source file, as the code signature no longer relies on naming conventions.

At stage 512, each language reserved keyword and key phrase of the source file is replaced with a corresponding compact byte representation to produce an encoded sequence. In an embodiment, each language reserved keyword and key phrase may be mapped to a byte representation, for example a single ASCII character. These mappings may be predefined or defined dynamically. This drastically reduces the size of the encoded sequence for storage and processing. As described previously, one of skill in the art will appreciate that the corresponding compact byte representations need not be exactly one byte in size, but will typically be smaller in size than the corresponding language reserved keywords and key phrases. Stage 512 may be repeated for individual modules within the source file to create additional code sequences for those individual modules. Individual modules in a source file may be, for example, classes, functions, subroutines, or blocks of a predetermined number of lines of code, as described with respect to FIG. 1. In this manner, creation of code sequences for individual modules may then represent code snippets within a source file.

Finally, at stage 514, the encoded sequences are hashed to produce code signatures for the source file including, in an embodiment, code signatures for individual modules of the source file. Any available hash function may be used for this purpose, such as but not limited to, MD5, SHA1, SHA2, RIPEMD, or Whirlpool.

Figure 6:
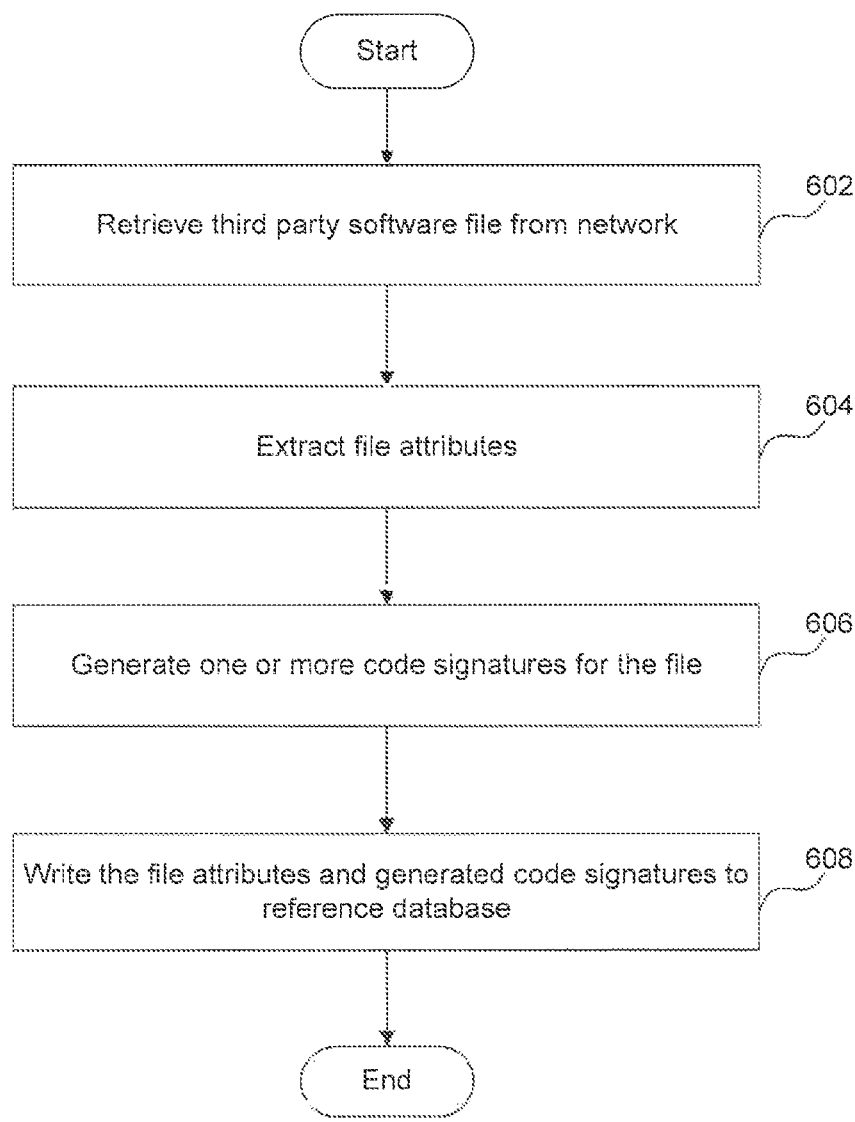
FIG. 6 is an example method for retrieving and indexing third party software data for use in detecting third party software components in a software codebase, according to an embodiment.

FIG. 6 is an example method for retrieving and indexing third party software data for use in detecting third party software components in a software codebase, according to an embodiment. Method 600 begins at stage 602 by retrieving a third party software file from a network, such as the Internet. In an embodiment, a software indexer, such as software indexer 122 of FIG. 1, may crawl one or more third party sources in order to retrieve the third party file, as described further with respect to FIG. 1.

At stage 604, file attributes may then be extracted or derived from the third party software file. These attributes may be used in determining the presence of the third party software file or contained software components within a software codebase. In an embodiment, file attributes extracted or derived from the source file may include, but are not limited to, authorship information, copyright ownership information, license information, license obligations, encryption scheme, file path, and file origin, as previously described in further detail.

In an embodiment, certain identifying attributes, for example license information and license obligations, may be extracted or derived from files related to the third party software file. For example, license information may be stored in a separate file within a folder hierarchy in which the third party software file resides. In an embodiment, the folder hierarchy in which the third party software file resides may be scanned to identify additional files that may contain identifying attributes for the third party software file. These additional files may then be analyzed to extract or derive identifying information.

At stage 606, one or more code signatures may be generated for the third party software file. In an embodiment, code signatures may be generated in the same manner as described with respect to FIG. 5. The code signatures may similarly be used to determine the presence of the third party software file or contained software components within a software codebase.

Finally, at stage 608, the extracted and derived file attributes and the generated code signatures may be written to a reference database, such as reference database 130 of FIG. 1.

Example Computer System

Figure 7:
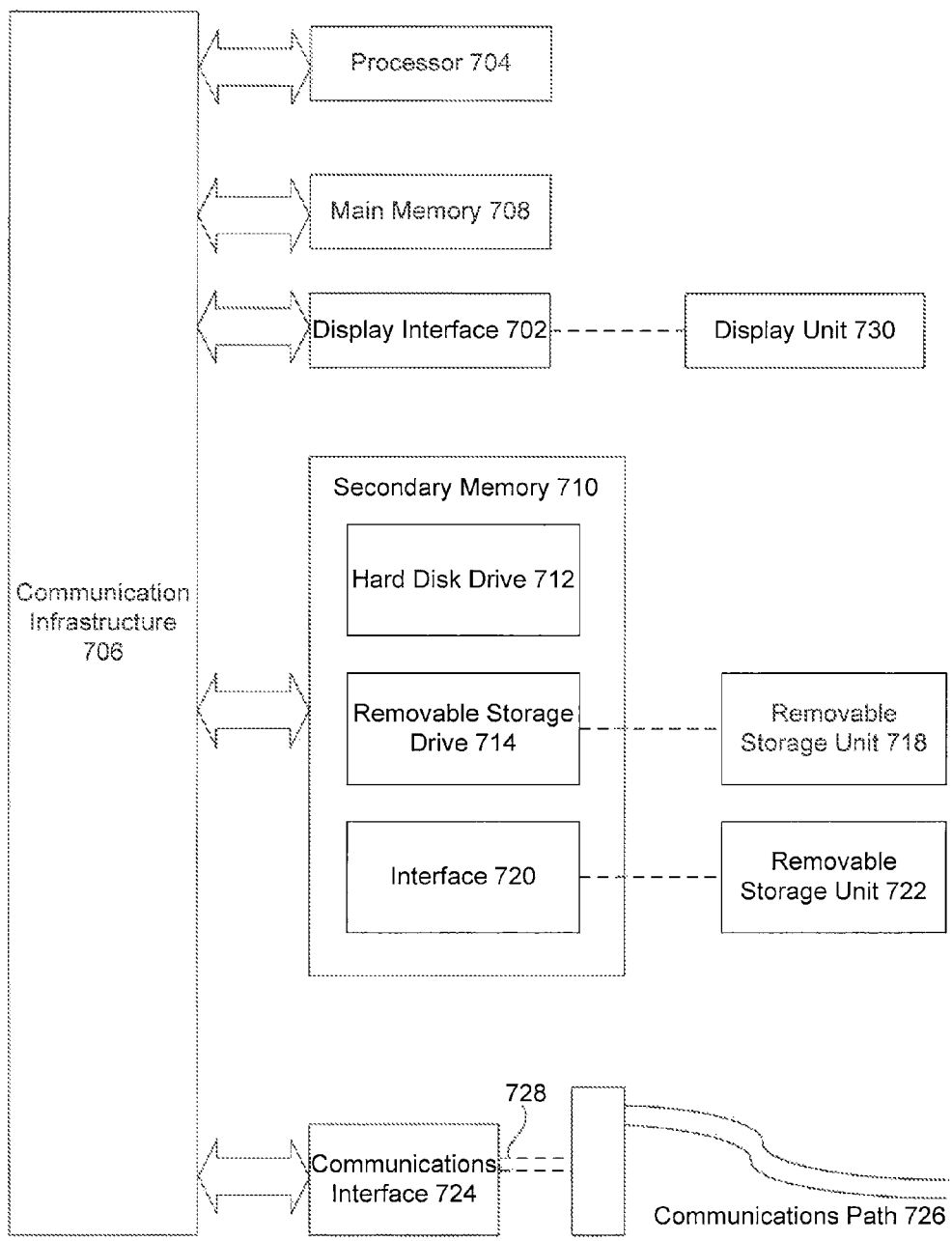
FIG. 7 is a diagram illustrating an example computing device, according to an embodiment.

FIG. 7 is an example computing system useful for implementing various embodiments. Various embodiments can be implemented, for example, using one or more well-known computer systems, such as computer system 700. Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 may be connected to a communication infrastructure or bus 706.

One or more processors 704 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/or any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the inventions using data processing devices, computer systems and/or computer architectures other than that shown in FIG. 7. In particular, embodiments may operate with software, hardware, and/or operating system implementations other than those described herein.

CONCLUSION

Identifiers, such as "(a)," "(b)," "(i)," "(ii)," etc., are sometimes used for different elements or steps. These identifiers are used for clarity and do not necessarily designate an order for the elements or steps.

Embodiments of the present inventions have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present inventions. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present inventions should not be limited by any of the above-described embodiments, but should be defined only in accordance with the following claims and their equivalents.

What is claimed is:

1. A method for detecting third party software components in a source file, comprising:
   receiving a source file containing source code at a server;
   generating a code signature for the source file, the generating comprising:
   determining a language of the source file;
   identifying a list of language reserved keywords and key phrases associated with the programing language;

removing from the source file text that does not match a language reserved keyword or key phrase of the identified list;

removing from the source file language-specific control characters and control character sequences;

replacing each language reserved keyword and key phrase of the source file with a corresponding compact byte representation to produce an encoded sequence; and hashing the encoded sequence to produce the code signature;

comparing the generated code signature to signatures stored in a reference database to identify matching third Party software files, the reference database storing a plurality of code signatures corresponding to the third party software files;

creating a list of the identified third party software files; and presenting the list of identified third party to a user.

2. The method of claim 1, wherein generating the code signature for the source file further comprises:

dividing the source code of the source file into one or more code modules;

generating a separate code signature for each of the one or more code modules; and aggregating the generated separate code signatures for each of the one or more code modules to produce the code signature for the source file.

3. The method of claim 2, further comprising:

comparing one or more of the generated separate code signatures to the signatures stored in the reference database to identify matching third party software files.

4. The method of claim 1, further comprising:

parsing the source file to determine identifying attributes of the source file; and filtering the created list of identified third party software files by comparing one or more of the determined identifying attributes to corresponding identifying attributes of the matching third party software files, wherein the corresponding identifying attributes are stored in the reference database.

5. The method of claim 4, wherein the identifying attributes of the source file include at least one of authorship information, copyright ownership information, license information, license obligations, encryption scheme, code quality attributes, file path, and file origin.

6. The method of claim 1, wherein the code signatures for the third party software files are cached by the server, and wherein generated separate code signatures are compared to the cached signatures to identify matching third party software files.

7. The method of claim 1, wherein data stored in the reference database is accessible via an application programming interface (API).

8. A system for detecting third party software components in a source file, comprising:

one or more computing devices;

a reference database storing code signatures corresponding to a plurality of third party software files;

a signature generator, implemented on the one or more computing devices, configured to:

receive a source file containing source code;

determine a programming language of the source file;

identify a list of language reserved keywords and key phrases associated with the programming language;

remove from the source file text that does not match a language reserved keyword or key phrase of the identified list;

remove from the source file language-specific control characters and control character sequences;

replace each language reserved keyword and key phrase of the source file with a corresponding compact byte representation to produce an encoded sequence; and generate a code signature for the source file based on a hash of the one or more representations;

an analyzer, implemented able on the one or more computing devices, configured to:

compare the generated code signature to the signatures stored in the reference database to identify matching third party software files; and create a list of the identified third party software files; and a presenter, implemented on the one or more computing devices, configured to present the list of identified third party software files to a user.

9. The system of claim 8, wherein the signature generator is further configurable to generate the code signature for the source file by:

dividing the source code of the source file into one or more code modules;

generating a separate code signature for each of the one or more code modules; and aggregating the generated separate code signatures for each of the one or more code modules to produce the code signature for the source file.

10. The system of claim 9, wherein the analyzer is further configurable to:

compare one or more of the generated separate code signatures to the code signatures stored in the reference database to identify matching third party software files.

11. The system of claim 8, wherein the analyzer is further configurable to:

parse the source file to determine identifying attributes of the source file; and filter the created list of identified third Party software files by comparing one or more of the determined identifying attributes to corresponding identifying attributes of the matching third party software files, wherein the corresponding identifying attributes are stored in the reference database.

12. The system of claim 11, wherein the identifying attributes of the source file include at least one of authorship information, copyright ownership information, license information, license obligations, encryption scheme, code quality attributes, file path, and file origin.

13. The system of claim 8, further comprising:

a local database, implementable on the one or more computing devices, configurable to store signatures for the third party software files, wherein the analyzer is further configurable to compare generated code signatures to the signatures stored in the local database to identify matching third party software files.

14. The system of claim 8, wherein data stored in the reference database is accessible via an application programming interface (API).

15. A non-transitory computer-readable storage device having instructions stored thereon that, when executed by at least one computing device, causes the at least one computing device to perform operations comprising:

receiving a source file containing source code at a server;

generating a code signature for the source file based, the generating comprising:
    determining a language of the source file;
    identifying a list of language reserved keywords and key phrases associated with the programing language;
    removing from the source file text that does not match a language reserved keyword or key phrase of the identified list;
    removing from the source file language-specific control characters and control character sequences;
    replacing each language reserved keyword and key phrase of the source file with a corresponding compact byte representation to produce an encoded sequence; and
    hashing the encoded sequence to produce the code signature;
comparing the generated code signature to signatures stored in a reference database to identify matching third Party software files, the reference database storing a plurality of code signatures corresponding to the third party software files;
creating a list of the identified third party software files; and
presenting the list of identified third party software files to a user.

16. The computer-readable storage device of claim 15, wherein generating a code signature for the source file further comprises:
    dividing the source code of the source file into one or more code modules;
    generating a separate code signature for each of the one or more code modules; and
    aggregating the generated separate code signatures for each of the one or more code modules to produce the code signature for the source file.

17. The computer-readable storage device of claim 16, the operations further comprising:
    comparing one or more of the generated separate code signatures for the one or more code modules to the signatures stored in the reference database to identify matching third party software files.

18. The computer-readable storage device of claim 15, the operations further comprising:
    parsing the source file to determine identifying attributes of the source file; and
    filtering the created list of identified third party software files by comparing one or more of the determined identifying attributes to corresponding identifying attributes of the matching third party software files,
    wherein the corresponding identifying attributes are stored in the reference database.

19. The computer-readable storage device of claim 18, wherein the identifying attributes of the source file include at least one of authorship information, copyright ownership information, license information, license obligations, encryption scheme, code quality attributes, file path, and file origin.

20. The computer-readable storage device of claim 15, wherein the signatures for the third party software files are cached by the server, and wherein separate generated code signatures are compared to the cached signatures to identify matching third party software files.

21. The computer-readable storage device of claim 15, wherein data stored in the reference database is accessible via an application programming interface (API).

* * * * *